United States Patent
Daily et al.

(10) Patent No.: US 7,120,875 B2
(45) Date of Patent: Oct. 10, 2006

(54) METHOD AND APPARATUS FOR AUGMENTED REALITY HYBRID TRACKING SYSTEM WITH FIDUCIAL-BASED HEADING CORRECTION

(75) Inventors: Michael J. Daily, Thousand Oaks, CA (US); Ronald T. Azuma, Santa Monica, CA (US); Howard E. Neely, III, Manhattan Beach, CA (US); Gerald B. Isdale, Thousand Oaks, CA (US)

(73) Assignee: X-Labs Holdings, LLC, Beverly Hills, CA (US)

( * ) Notice: Subject to any disclaimer, the term of this patent is extended or adjusted under 35 U.S.C. 154(b) by 819 days.

(21) Appl. No.: 10/282,397

(22) Filed: Oct. 29, 2002

(65) Prior Publication Data

US 2004/0080548 A1    Apr. 29, 2004

(51) Int. Cl.
  *G06F 3/00* (2006.01)
  *H04N 5/228* (2006.01)
  *G06K 9/00* (2006.01)
(52) U.S. Cl. .................. 715/757; 382/103; 348/208.14
(58) Field of Classification Search ................ 715/757
See application file for complete search history.

(56) References Cited

U.S. PATENT DOCUMENTS

| 6,064,749 | A | 5/2000 | Hirota et al. | |
| 6,560,354 | B1 * | 5/2003 | Maurer et al. | 382/131 |
| 6,765,569 | B1 * | 7/2004 | Neumann et al. | 345/419 |
| 2004/0071315 | A1 * | 4/2004 | Neely | 382/103 |
| 2004/0104935 | A1 * | 6/2004 | Williamson et al. | 345/757 |

OTHER PUBLICATIONS

Azuma, Ward. Space-Resection by Collinearity: Mathematics Behind the Optical Ceiling Head-Tracker. UNC Chapel Hill Department of Computer Science Technical Report TR 91-048 (Nov. 1991).

Azuma, Hoff, Neely, Sarfaty, "An Motion-Stabilized Outdoor Augmented Reality System," Proceedings of IEEE Virtual Reality 1999 (Houston, TX, Mar. 13-17, 1999), pp. 252-259.

Neumann, Ulrich and Youngkwan Cho, A Self-Tracking Augmented Reality System. Proceedings of VRST '96 (Hong Kong, Jul. 1-4, 1996), 109-115.

* cited by examiner

*Primary Examiner*—Kristine Kincaid
*Assistant Examiner*—Lê Nguyen
(74) *Attorney, Agent, or Firm*—Richard E. Ballard

(57) ABSTRACT

An apparatus and method is disclosed for enabling accurate registration of virtual information upon real objects in selected environments from the perspective of a moveable observation platform having a position and an orientation within an observation space positioned within the environment, the position and orientation defining the registration of the virtual information within the observation space within the environment, which may comprise: a plurality of at least three tracking fiducials selectively each respectively located in fixed predetermined locations in the observation space; the observation platform including a position sensor apparatus adapted to sense an estimated position of the observation platform in the observation space and a heading sensor apparatus adapted to sense an estimated heading of the observation platform within the observation space; the observation platform further including a wide view fiducial detection apparatus mounted on the observation platform and adapted to detect the relative direction from the observation platform to each of the plurality of tracking fiducials, a heading error detection apparatus adapted to detect the difference between the estimated heading and the present heading based upon the observed relative directions to the respective tracking fiducials, and forming a corrected heading from the estimated heading and the detected heading error.

24 Claims, 1 Drawing Sheet

METHOD AND APPARATUS FOR AUGMENTED REALITY HYBRID TRACKING SYSTEM WITH FIDUCIAL-BASED HEADING CORRECTION

FIELD OF THE INVENTION

The present invention relates to the field of tracking the position and heading of an object, e.g., a user of an augmented reality system through fiducial-based hybrid tracking.

SOFTWARE SUBMISSION

Accompanying this Application as an Appendix thereto and incorporated by reference herein as if fully incorporated within this Application is a media copy of the software currently utilized by the applicants in the implementation of some or all of the presently preferred embodiments of the inventions disclosed and claimed in this Application.

BACKGROUND OF THE INVENTION

Hybrid tracking systems are known which enable somewhat accurate registration of virtual information, e.g., images, upon real objects in selected outdoor environments. Such outdoor applications often can be used in well-defined areas where it is feasible, e.g., to add a few objects to the environment that may serve to help the tracking. A better system utilizing such accurate registration is needed.

Often Augmented Reality systems employ a 6-D tracking system that can measure, in real time, the orientation and position of the user at all times. This may be required, e.g., for the system to know exactly how to draw the virtual objects so that they appear in their proper positions with respect to the real world in which the user is positioned and respecting which the user wishes to insert the virtual information, e.g., an image of a building on an empty lot.

Reasonably accurate tracking systems have also been developed for indoor settings, where the system designer may have much more control over the environment and may be more able to modify it as needed. However, the ability to track more accurately in outdoor environments, where the system designer may have no control over the environment, could enable more augmented reality applications. Currently, such satisfactory tracking has only been achieved under significantly constrained circumstances (e.g., the user does not walk around) or with prohibitively expensive equipment.

Fiducials, which are easily identifiable markers which can be added to the environment to make the visual tracking more simple, are known to be useful in position and orientation tracking. Use of fiducials in an augmented reality system is discussed, e.g., in Bajura, Mike and Ulrich Neumann, Dynamic Registration Correction in Augmented-Reality Systems. *Proceedings of IEEE VRAIS* '95 (Research Triangle Park, NC, Mar. 11–15, 1995), 189–196 (the disclosure of which is hereby incorporated by reference). Discussed therein, is an example of using fiducials to supplement 6-D tracking. A separate 6-D tracker, such as a magnetic-based system like the Polhemus, as discussed in Raab, F., Bood, E., Steiner, O., Jones. H. Magnetic position and orientation tracking system. IEEE Transactions on Aerospace and Electronic Systems, AES-15 (5), 1979, pp. 709–717, which generates an initial guess of the user's position and orientation. Then the fiducials which can be detected by a video tracking system can be used to correct this initial guess. The corrections can be applied to orientation only or in 6-D. Another example of this appears in State, Andrei, Gentaro Hirota, David T. Chen, Bill Garrett, and Mark Livingston, Superior Augmented Reality Registration by Integrating Landmark Tracking and Magnetic Tracking. *Proceedings of SIGGRAPH* '96 (New Orleans, La., Aug. 4–9, 1996), 429–438, and the related U.S. Pat. No. 6,064,749, issued to Hirota, et al. May 16, 2000, entitled HYBRID TRACKING FOR AUGMENTED REALITY (the disclosures of each of which are hereby incorporated by reference).

Other examples of visual-based tracking exist, which employ the detection of fiducials. These methods, however, do not use multiple sensors. Instead they typically find the 2-D locations of the fiducials in an image, and combining that with the known 3-D locations of the fiducials, they recover the 6-D location of, e.g., the camera creating the image. These methods suffer from the shortcoming, however, that they need to see, typically at a minimum, 3 fiducials at all times. In practice, however, such methods may not be stable unless they can include in the image a larger numbers of fiducials (e.g., 6 or more). For a narrow field of view camera this can mean the density of fiducials in the environment must be very large. These solutions tend to be more stable if the fiducials are spread widely apart (requiring multiple cameras or a wide field of view, but the wide field of view spreads the resolution across a large area). One example of pure fiducial tracking is discussed in Neumann, Ulrich and Youngkwan Cho, A Self-Tracking Augmented Reality System. *Proceedings of VRST* '96 (Hong Kong, Jul. 1–4, 1996), 109–115.

SUMMARY OF THE INVENTION

An apparatus and method is disclosed for enabling accurate registration of virtual information upon real objects in selected environments from the perspective of a moveable observation platform having a position and an orientation within an observation space positioned within the environment, the position and orientation defining the registration of the virtual information within the observation space within the environment, which may comprise: a plurality of at least three tracking fiducials selectively each respectively located in fixed predetermined locations in the observation space; the observation platform including a position sensor apparatus adapted to sense an estimated position of the observation platform in the observation space and a heading sensor apparatus adapted to sense an estimated heading of the observation platform within the observation space; the observation platform further including a wide view fiducial detection apparatus mounted on the observation platform and adapted to detect the relative direction from the observation platform to each of the plurality of tracking fiducials, relative to a heading direction of the observation platform, assuming an approximated heading direction of the observation platform, the wide view fiducial detection apparatus adapted further to detect fiducials in a panoramic field of view greater than at least 180 degrees; a heading error detection apparatus adapted to detect the difference between the estimated heading and the present heading based upon the observed relative directions to the respective tracking fiducials, and forming a corrected heading from the estimated heading and the detected heading error; a position error detection apparatus adapted to detect the difference between the estimated position in the observation space and the actual position based upon the observed positions of the respective fiducials and the corrected heading of the observation platform. The apparatus and method may further comprise the estimated heading is derived from at least the output of a rotation sensor and from a prior corrected position determination if a prior corrected position determination is available; the estimated heading is a prior corrected heading determination; the estimated position is derived from at least the output of a position detector and from a prior corrected position determination if a prior corrected position determination is available or the estimated position is a prior corrected position determination.

DETAILED DESCRIPTION OF THE PREFERRED EMBODIMENTS

The present invention may include a system that operates in certain outdoor augmented reality applications, e.g., where the user can walk around a more or less well defined area that can be modified with a few fiducials. Examples of such outdoor applications could include GIS (Geographical Information Systems) visualization at the actual outdoor site, and real estate visualization to show the effects of proposed changes or what a new building will look like when viewed from a particular location and orientation.

Figure 1:
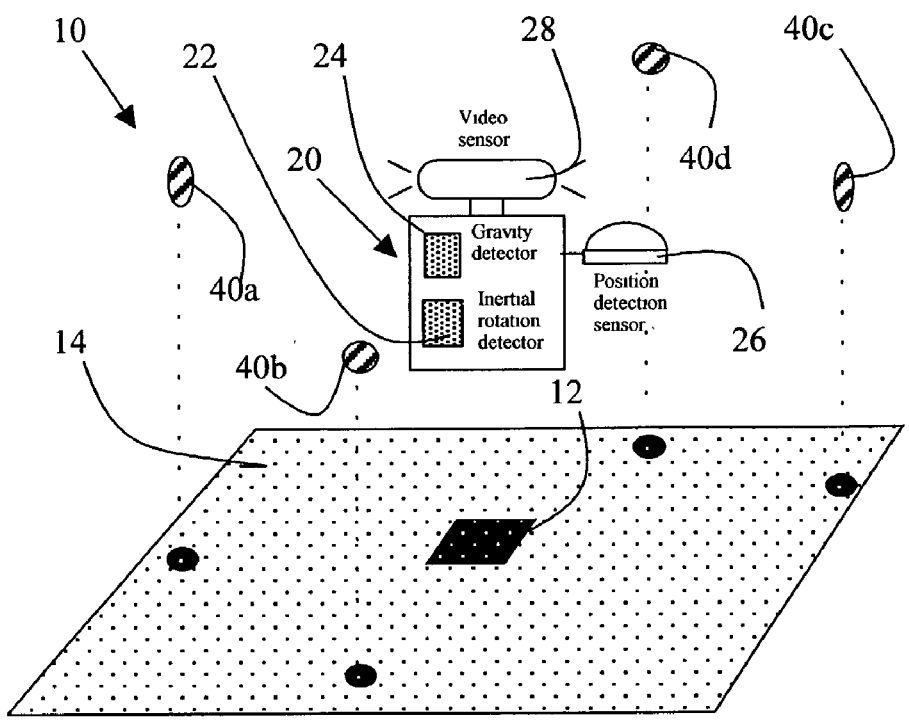
FIG. 1 shows a simplified view of a system according to an embodiment of the present invention.

Turning now to FIG. 1 there is shown a system 10 according to a preferred embodiment of the present invention. The system 10 may be employed, e.g., to track the location 12 of a user in relation to a two dimensional plane 14, along with a heading vector 52 as discussed in relation to FIG. 2. The user may be equipped with a sensing device 20 that contains an array of hybrid sensors. These might be worn on the head (for a head-mounted display) or held in the user's hand (for a hand-held display). These hybrid sensors may include an inertial rotation detector 22, a gravity detector 24, a position detection sensor 26, and a panoramic video sensor 28. Around the user can be placed several fiducial markers, e.g., 40a, 40b, 40c and 40d, which can be positioned to provide 360 degree coverage around the area that the user moves.

The fiducials 40a–40d can be placed at known 3-D locations within an observation space within the environment defined by the positioning of the fiducials within the observation space and the orientation of the observation space to the environment. The fiducials 40a–40d also can comprise markers that can be easily identified by the panoramic video sensor 28, which can act as a visual tracking system. There are many types of fiducials 40a–40d, which may be employed. For example, the fiducials 40a–40d might be infrared beacons, where, e.g., each beacon blinks at a unique pattern to identify itself. The fiducials 40a–40d could also be objects of a particular color combination or pattern, or they may be black and white with unique patterns, either of which may be easily segmented and identified, e.g., in well known electronic pattern recognition equipment (not shown).

The gravity detector 24 may be, e.g., a sensor that employs, e.g., a set of tilt sensors, detecting pitch and roll of the sensing device 20. Tilt sensors (not shown) can be constructed in a variety of ways, including, e.g., fluidic or mechanical approaches as are well known. Alternatively, the gravity detector could be comprised of a triaxial set of accelerometers (not shown), e.g., implemented in integrated circuit MEMs technology as is also well known. The gravity detector can be utilized to return an accurate measurement of the "down" direction when the sensing device is kept still. Otherwise they may be affected by acceleration due to motion, which may be difficult to cancel out before detecting the acceleration in the "down" direction.

The inertial rotation detector 22 can be comprised of a sensor that detects angular rotation rate along three orthogonal axes. Such a detector may comprise, e.g., a known angular rate gyroscope, which may also be able to be implemented in integrated circuit MEMs technology. The rotation detector 22 can sense, e.g., the change in rotation, subject to, e.g., an accumulated drift error. Some high-end angular rate gyroscopes (such as Fiber Optic Gyroscopes, or FOGs) can be quite accurate, but may have drift rates of a few degrees per hour.

The position detection sensor 26 can be utilized to provide an (x, y, z) position of the sensing device 20 in the environment and as oriented in the observation space within the environment. The position detection sensor 26 may comprise, e.g., a GPS (the Global Positioning System) device, which also may be provided in integrated circuitry as supplied, e.g., by Rockwell International and others, e.g., sold as Trimble or Magellan. Differential GPS systems, such as those noted can reduce the typical error of a stand-alone GPS receiver from about 30 meters to about 3 meters. Carrier-phase GPS systems may achieve an accuracy measured in centimeters, but can require favorable circumstances to achieve that accuracy and can require a long acquisition startup time. GPS can also require a clear view of much of the sky to work well. Alternately, the position detection sensor 26 could be based on an active system, such as RF emitters that use time of flight or signal strength to estimate the position of the unit, as is well known for example in systems operating, e.g., like LORAN C, or, e.g., using pseudolites, effectively, e.g., setting up a "local GPS" system.

The panoramic video sensor 28 can preferably comprise, e.g., a panoramic video sensor/camera that can provide simultaneous 360 degree horizontal coverage. Alternately the panoramic video sensor 28 can be a group of several small video cameras aimed in different directions, in order to provide the same panoramic coverage. The panoramic video sensor/camera 28 can be utilized to detect the directions of the known fiducials 40a–40d in the environment in relation to the system 10.

Figure 2:
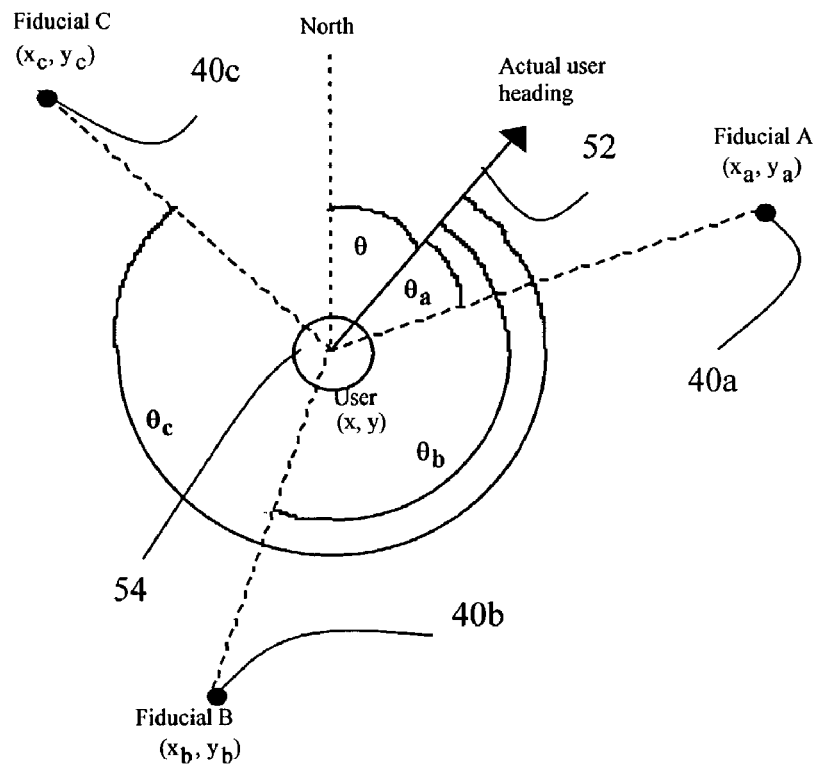
FIG. 2 a plan view of the interaction of certain elements of an embodiment of the present invention.

Without the utilization of fiducial markers, e.g., 40a–40d, a principal difficulty in tracking position and orientation in an outdoor environment is the need to accurately correct the yaw (heading) 52 in FIG. 2 and horizontal position (x, y) 54 as illustrated in FIG. 2. Integrating the output of the gyroscopes, e.g., in the inertial rotation detector 22 can yield an orientation measurement. However, that orientation measurement can tend to drift away from the true orientation over time.

This drift must be removed, e.g., through occasional corrective inputs to the inertial rotation detector 22.

With the user, e.g., standing still, the gravity detector 24 can be used, e.g., to determine which way is "down." This can be utilized to remove the drift from the roll and pitch components of orientation. A good estimate of when the user is still can be made by computing, e.g., the magnitude of omega, the vector of angular rates. When the magnitude of the vector omega is below a selected threshold, then the magnitude of the total acceleration can be assumed to be essentially the acceleration due to gravity. The user is then most likely standing still, i.e., the system 10 is being kept still.

However, this procedure does not correct for the drift in yaw. Using a compass to correct for yaw is possible, but is generally not accurate in generic outdoor situations. This can be due to a number of factors, e.g., the Earth's magnetic field is a relatively weak signal and is vulnerable to localized environmental distortions. GPS has errors in measuring position, and these errors can be too large for some applications. If the virtual objects placed in the real environment are a relatively short distance away (e.g., on the order of a hundred yards or so) then position accuracy can become crucial. A 3 meter error in position measurement, which is typical under differential GPS, would not allow accurate registration in those circumstances. Therefore the present invention provides for a supplemental method of getting more accurate position measurements.

The present invention can use a small number of fiducials, e.g. three or four, which can be placed at predetermined locations in the environment, and utilized strictly to recover the most difficult things to measure while operating outdoors, i.e., yaw and horizontal position. The present invention does not attempt a full 6-D recovery. By simplifying the problem in this manner, it is possible to operate with far fewer fiducials, e.g., 40a, 40b and 40c, as shown in FIG. 2, which may even be less than the already limited number of fiducials, e.g., 40a–40d as shown in FIG. 1. Utilizing a smaller number of fiducials than other approaches might require, can make the present invention more practical for actual implementation. The time and effort in exactly placing each fiducial in an outdoor environment can be significant and the magnitude grows with each additional fiducial needed.

This approach of the present invention may also be more stable and have greater geometric strength. In traditional video see-through approaches, the tracking is done on the same video image that provides the user's view of the real world. This image is generally taken with a camera that has a narrow field of view (e.g., to match the display). The resulting system, e.g., may only track on fiducials seen within a narrow range of angles. This makes the tracking problem more difficult and prone to unstable solutions.

In contrast, according to the present invention, e.g., a panoramic video sensor (camera) 28 with widely-spaced fiducial markers, e.g., 40–40c as shown in FIG. 2, surrounding the user are utilized. This can give much greater geometric strength and reduce the chance of unstable solutions. The position and orientation trackers 22, 24, 26 and 28 of the sensing device 20 can run as separate Kalman filters. An orientation filter (not shown) can integrate the gyroscopes in the inertial rotation detector 22 at a rapid rate (e.g. a 1 kHz rate), where occasional corrections for roll, pitch and yaw are made available. A sample filter (using a somewhat different sensor set) was described in Azuma, Hoff, Neely, Sarfaty, "An Motion-Stabilized Outdoor Augmented Reality System," *Proceedings of IEEE Virtual Reality* 1999 (Houston, Tex., Mar. 13–17, 1999), pp. 252–259, the disclosure of which is hereby incorporated by reference).

The position tracker can, e.g., read the GPS on a regular basis (e.g. a few Hz) with occasional position measurements input as derived from the fiducials, as further explained below. An aspect of the present invention relates to the computing of heading and (x, y) horizontal position corrections that can be provided to the Kalman filters. Assuming there are at least three fiducials 40a–40c with which the system can work, the computation method is illustrated in FIG. 2. The present invention involves solving for three unknowns: the user position (x, y) and the heading θ. The position variables x and y can be considered to be all in the observation space as oriented to the environment. The positions of fiducials 40a–40c within the environment, can all be considered to be known. The directions to the fiducials ($\theta_a$, $\theta_b$, $\theta_c$) can be considered to be in the panoramic video sensor (camera) 28 space and can be measured by the panoramic video sensor (camera) 28. With three unknowns and three measurements, there should be enough information to simultaneously determine the three unknown variables. However, since this is a nonlinear system a direct analytic solution is not feasible.

The present invention presents the problem of simultaneously solving three nonlinear equations. An approach to solving this can be to generate the equations that will be true if all the unknowns have their true values, comprising an initial guess. An iterative approach can then be used, along with the initial guess. In tracking a user, there exists a good initial guess almost all the time, i.e., the last known position and orientation of the user, at least after some initialization. The present invention can use, e.g., the Newton-Raphson method, in which a linear approximation to the nonlinear system is generated using, e.g., Taylor's Theorem. Then using the linear approximation the present invention generates correction factors to the initial guess as to the solution. The corrections can be added and the process steps repeated until the solution converges. An example of this approach (although not for this particular problem) is described in great detail in, Azuma, Ward, Space-Resection by Collinearity: Mathematics Behind the Optical Ceiling Head-Tracker, UNC Chapel Hill Department of Computer Science Technical Report TR 91-048 (November 1991), 23 pages, (the disclosure of which is hereby incorporated by reference). With an iterative approach and with no more than three fiducials available, errors due to camera resolution or noise, etc., can still be effectively removed.

The equations that are true if the correct values for the unknown variables are known can be derived. An equation for fiducial A, and the equations for the other two are analogous. First, let $$d_A = \sqrt{(x_A-x)^2 + (y_A-y)^2}$$

From the geometry:

$$\cos(\theta + \theta_A) = \frac{y_A - y}{d_A}$$

Rewriting that equation yields:

$$\cos(\theta)\cos(\theta_A) - \sin(\theta)\sin(\theta_A) = \frac{y_A - y}{d_A}$$

$$d_A[\cos(\theta)\cos(\theta_A) - \sin(\theta)\sin(\theta_A)] + y - y_A = 0$$

If the subscripts are changed from A to B or C, the other two equations are produced. Given these equations, linearization can be done by applying Taylor's theorem and taking the partial derivative of each of the three equations with respect to each of the three unknowns. This results in a linear system of 3 equations, which can be solved for the differences in x, y, and θ. Then according to the present invention, iteration can be done until the differences become so small that the solution has converged.

Another aspect of this problem that can be addressed is the problem of setting up the fiducials. The positions of these fiducials must be known for this method to work. That means they have to be measured, which requires time and effort. Knowing the position of the sensor unit, however, (perhaps through a carrier phase GPS) at several locations, where at each location the system detects the angles to the fiducials, then it may be possible to derive the locations of the fiducials through an iterative approach similar to what is done during the tracking (where the true heading is not known at each location). Such autocalibration approaches can form an important part of making systems like that of the present invention practical. It may also be possible to converge on a solution (given reasonable initial guesses for everything) even without a carrier phase GPS providing the true location of the sensor unit.

The foregoing invention has been described in relation to a presently preferred embodiment thereof. The invention should not be considered limited to this embodiment. Those skilled in the art will appreciate that many variations and modifications to the presently preferred embodiment, many of which are specifically referenced above, may be made without departing from the spirit and scope of the appended claims. The inventions should be measured in scope from the appended claims.

We claim:

1. An apparatus for enabling accurate registration of virtual information upon real objects in selected environments from the perspective of a moveable observation platform having a position and an orientation within an observation space positioned within the environment, the position and orientation defining the registration of the virtual information within the observation space within the environment, comprising: at least three tracking fiducials selectively each respectively located in fixed predetermined locations in the observation space; the observation platform including a position sensor apparatus adapted to sense an estimated position of the observation platform in the observation space and a heading sensor apparatus adapted to sense an estimated heading of the observation platform within the observation space; the observation platform further including a wide view fiducial detection apparatus mounted on the observation platform and adapted to detect the relative direction from the observation platform to each of the plurality of tracking fiducials, relative to a heading direction of the observation platform, assuming an approximated heading direction of the observation platform, the wide view fiducial detection apparatus adapted further to detect fiducials in a panoramic field of view greater than one hundred and eighty degrees; a heading error detection apparatus adapted to detect the difference between the estimated heading and the present heading based upon the observed relative directions to the respective tracking fiducials, and forming a corrected heading from the estimated heading and the detected heading error; a position error detection apparatus adapted to detect the difference between the estimated position in the observation space and the actual position based upon the observed positions of the respective fiducials and the corrected heading of the observation platform.

2. The apparatus of claim 1 wherein the estimated heading is derived from at least the output of a rotation sensor and from a prior corrected position determination if a prior corrected position determination is available.

3. The apparatus of claim 1 wherein the estimated heading is a prior corrected heading determination.

4. The apparatus of claim 2 wherein the estimated position is derived from at least the output of a position detector and from a prior corrected position determination if a prior corrected position determination is available.

5. The apparatus of claim 3 wherein the estimated position is a prior corrected position determination.

6. The apparatus of claim 4 wherein the estimated position is a prior corrected position determination.

7. The apparatus of claim 1 wherein the panoramic fiducial detection apparatus includes a camera having a greater field of vision that the field of vision of a human user of the camera.

8. The apparatus of claim 1 wherein the panoramic fiducial detection apparatus includes a camera having a three hundred and sixty degree field of vision coverage.

9. An apparatus for enabling accurate registration of virtual information upon real objects in selected environments from the perspective of a moveable observation platform having a position and an orientation within an observation space positioned within the environment, the position and orientation defining the registration of the virtual information within the observation space within the environment, comprising: at least three tracking fiducials selectively each respectively located in fixed predetermined locations in the observation space; the observation platform including a position sensing means for sensing an estimated position of the observation platform in the observation space and a heading sensing means for sensing an estimated heading of the observation platform within the observation space; the observation platform further including a wide view fiducial detection means mounted on the observation platform for detecting the relative direction from the observation platform to each of the plurality of tracking fiducials, relative to a heading direction of the observation platform, assuming an approximated heading direction of the observation platform, the wide view fiducial detection means including means for detecting fiducials in a panoramic field of view greater than one hundred and eighty degrees; a heading error detection means for detecting the difference between the estimated heading and the present heading based upon the observed relative directions to the respective tracking fiducials, and forming a corrected heading from the estimated heading and the detected heading error; a position error detection means for detecting the difference between the estimated position in the observation space and the actual position based upon the observed positions of the respective fiducials and the corrected heading of the observation platform.

10. The apparatus of claim 9 wherein the estimated heading is derived from at least the output of a rotation sensor and from a prior corrected position determination if a prior corrected position determination is available.

11. The apparatus of claim 9 wherein the estimated heading is a prior corrected heading determination.

12. The apparatus of claim 10 wherein the estimated position is derived from at least the output of a position detector and from a prior corrected position determination if a prior corrected position determination is available.

13. The apparatus of claim 11 wherein the estimated position is a prior corrected position determination.

14. The apparatus of claim 12 wherein the estimated position is a prior corrected position determination.

15. The apparatus of claim 9 wherein the panoramic fiducial detection means includes a camera having a greater field of vision that the field of vision of a human user of the camera.

16. The apparatus of claim 9 wherein the panoramic fiducial detection means includes a camera having a three hundred and sixty degree field of vision coverage.

17. A method for enabling accurate registration of virtual information upon real objects in selected environments from the perspective of a moveable observation platform having a position and an orientation within an observation space positioned within the environment, the position and orientation defining the registration of the virtual information within the observation space within the environment, comprising:

provinding a plurality of at least three tracking fiducials selectively each respectively located in fixed predetermined locations in the observation space;

the observation platform including a position sensing means for sensing an estimated position of the observation platform in the observation space and a heading sensing means for sensing an estimated heading of the observation platform within the observation space;

the observation platform further including a wide view fiducial detection means mounted on the observation platform for detecting the relative direction from the observation platform to each of the plurality of tracking fiducials, relative to a heading direction of the observation platform, assuming an approximated heading direction of the observation platform, the wide view fiducial detection means, including means for detecting fiducials in a panoramic field of view greater than at least one hundred and eighty degrees;

detecting the difference between the estimated heading and the present heading based upon the observed relative directions to the respective tracking fiducials, and forming a corrected heading from the estimated heading and the detected heading error;

detecting the difference between the estimated position in the observation space and the actual position based upon the observed positions of the respective fiducials and the corrected heading of the observation platform.

18. The method of claim 17 including the step of deriving the estimated heading from at least the output of a rotation sensor and from a prior corrected position determination if a prior corrected position determination is available.

19. The method of claim 17 including the step of utilizing as the the estimated heading a prior corrected heading determination.

20. The method of claim 18 including, the step of deriving the estimated position from at least the output of a position detector and from a prior corrected position determination if a prior corrected position determination is available.

21. The apparatus of claim 19 including the step of utilizing as the estimated position a prior corrected position determination.

22. The apparatus of claim 20 including the step of utilizing as the estimated position a prior corrected position determination.

23. The apparatus of claim 17 including the step of utilizing in the panoramic fiducial detection means a camera having a greater field of vision that the field of vision of a human user of the camera.

24. The apparatus of claim 17 wherein including the step of utilizing in the panoramic fiducial detection means a camera having a three hundred and sixty degree field of vision coverage.

* * * * *